United States Patent
Wang et al.

(10) Patent No.: US 8,480,360 B2
(45) Date of Patent: Jul. 9, 2013

(54) TURBOCHARGER TURBINE

(75) Inventors: Hang Wang, Hengyang (CN); Yanzhao Li, Shouguang (CN); Xilu Guo, Shouguang (CN); Hengxing Yang, Shouguang (CN); Lunhai Guo, Shouguang (CN)

(73) Assignee: Kangyue Technology Co., Ltd., Shouguang (CN)

( * ) Notice: Subject to any disclaimer, the term of this patent is extended or adjusted under 35 U.S.C. 154(b) by 0 days.

(21) Appl. No.: 13/341,918

(22) Filed: Dec. 31, 2011

(65) Prior Publication Data

US 2012/0099964 A1    Apr. 26, 2012

Related U.S. Application Data

(63) Continuation of application No. PCT/CN2009/074329, filed on Sep. 30, 2009.

(30) Foreign Application Priority Data

Jul. 3, 2009 (CN) .......................... 2009 1 0016706

(51) Int. Cl.
F04D 29/42 (2006.01)
(52) U.S. Cl.
USPC ........................................................ 415/205
(58) Field of Classification Search
USPC ................ 415/144, 145, 148, 151, 203, 204, 415/205, 224
See application file for complete search history.

(56) References Cited

U.S. PATENT DOCUMENTS

| | | | | |
|---|---|---|---|---|
| 3,423,926 A | * | 1/1969 | Holzhausen et al. | 60/615 |
| 4,389,845 A | * | 6/1983 | Koike | 60/602 |
| 4,565,068 A | * | 1/1986 | Schneider | 60/602 |
| 5,579,643 A | * | 12/1996 | McEwen et al. | 60/602 |
| 6,073,447 A | * | 6/2000 | Kawakami et al. | 60/602 |
| 6,553,762 B2 | * | 4/2003 | Loffler et al. | 60/605.1 |

FOREIGN PATENT DOCUMENTS

JP  2007-309140 A * 11/2007

* cited by examiner

*Primary Examiner* — Nathaniel Wiehe
*Assistant Examiner* — Joshua R Beebe
(74) *Attorney, Agent, or Firm* — Matthias Scholl P.C.; Matthias Scholl

(57) ABSTRACT

A turbocharger turbine having a double-layer flow passage and a variable cross-section, including a turbine housing, a volute diffuser channel, a power turbine, a volute gas feeding passage, and a partition wall. The volute gas feeding passage is arranged in the turbine housing. The partition wall is arranged in the volute gas feeding passage and divides the volute gas feeding passage into an external volute gas feeding passage and an internal volute gas feeding passage. The external volute gas feeding passage is located outside the internal volute gas feeding passage. The combination of the external and internal volute gas feeding passages forms different flow areas, sufficiently utilizing the waste gas energy of engines in a segmented mode. The variable cross-section turbine has a simple structure, is easy to upgrade at low cost, and can be easily mass-manufactured.

3 Claims, 7 Drawing Sheets

TURBOCHARGER TURBINE

CROSS-REFERENCE TO RELATED APPLICATIONS

This application is a continuation of International Patent Application No. PCT/CN2009/074329 with an international filing date of Sep. 30, 2009, designating the United States, now pending, and further claims priority benefits to Chinese Patent Application No. 200910016706.6 filed Jul. 3, 2009. The contents of all of the aforementioned applications, including any intervening amendments thereto, are incorporated herein by reference.

BACKGROUND OF THE INVENTION

1. Field of the Invention

The invention relates to a turbine, and more particularly to a turbine of a turbocharger with double-layer flow passage and variable cross-section.

2. Description of the Related Art

Currently, variable cross-section turbochargers have aroused more and more attention. To meet the requirements of variable cross-section, conventional turbines of turbochargers are provided with rotary nozzle vanes. As shown in FIG. 1 and FIG. 2, a turbine of a variable cross-section turbocharger 1 with rotary vanes includes a turbine housing 5, a volute diffuser channel 7, and a power turbine 9. The exhaust gas discharged by an engine during normal operation is collected through the turbine housing 5, passes through a volute gas feeding passage, and then is distributed around the power turbine 9 through the volute diffuser channel 7, thereby pushing the power turbine 9 to rotate at high speed. A compressor impeller 14 is driven to rotate to compress gas at high speed through a turbine rotor shaft 13 under the support of a floating bearing 12 in a middle shell 3. The compressed gas is collected through a compressor housing 2 and sent into the engine for combustion.

To make the supercharger work stably under high and low speed conditions, nozzle vanes 8 are arranged in the volute diffuser channel 7 of the turbine of the variable cross-section turbocharger 1 with rotary vanes. The nozzle vanes 8 are distributed on a nozzle ring supporting disk 6 around the power turbine 9, and the opening a1 thereof can be adjusted through a transmission mechanism 4, thereby changing the actual flow area of the volute diffuser channel 7 and the rotation speed of the power turbine 9. The high temperature gas in the engine can be discharged into the engine exhaust pipe through a volute gas outlet 10 after doing power in the power turbine 9.

The variable cross-section turbocharger 1 with rotary vanes can change the flow channel through changing the opening a1 among the nozzle vanes 8, with convenient control. However, the exhaust gas discharged from the engine generally has an exhaust temperature of about 600° C., which tends to be higher. The high exhaust temperature poses strict requirements on the nozzle vanes 8, the transmission mechanism 4, the nozzle ring support disk, and external control systems. Thus, the cost of this type of variable cross-section turbocharger is very high and the service life thereof is short, resulting in a limited market.

SUMMARY OF THE INVENTION

In view of the above-described problems, it is one objective of the invention to provide a turbine of a turbocharger with double-layer flow passage and variable cross-section that can effectively solve the defect of fixed cross-section of conventional turbochargers, and simplify the complicated adjusting structure of conventional variable cross-section turbochargers with rotary vanes, thereby improving the product reliability and reducing costs.

To achieve the above objective, in accordance with one embodiment of the invention, there is provided a turbine of a turbocharger comprising a turbine housing, a volute diffuser channel, a power turbine, a volute gas feeding passage, and a partition wall, wherein the volute gas feeding passage is arranged in the turbine housing, the partition wall is arranged in the volute gas feeding passage and divides the volute gas feeding passage into an external volute gas feeding passage and an internal volute gas feeding passage, and the external volute gas feeding passage is located outside the internal volute gas feeding passage.

In a class of this embodiment, the partition wall is integrated with the turbine housing through a connector.

In a class of this embodiment, the connector is a flow passage rib arranged in the external volute gas feeding passage.

In a class of this embodiment, the external volute gas feeding passage is provided with a reduced outlet communicated with the volute diffuser channel, and a gas flow internal guiding face and a gas flow external guiding face are respectively arranged on two sides of the reduced outlet.

In a class of this embodiment, the gas flow external guiding face and the gas flow internal guiding face form an incidence angle. An external wall of the internal volute gas feeding passage is also used as an internal wall of the external volute gas feeding passage.

In a class of this embodiment, the external volute gas feeding passage is located outside the internal volute gas feeding passage; the external volute gas feeding passage does not work independently, and works with the internal volute gas feeding passage to meet the boost demand of high-volume power of an engine under medium and high rotation speed.

In a class of this embodiment, the internal volute gas feeding passage is a single flow passage, and the position of the reduced outlet close to the external volute gas feeding passage is provided with an outlet of the internal volute gas feeding passage communicated with the volute diffuser passage.

In a class of this embodiment, the internal volute gas feeding passage is located inside the turbine housing, thereby meeting the boost demand of the engine under medium and low rotation speed and ensuring the acceleration performance of the engine.

In a class of this embodiment, to ensure that the supercharger does not exceed speed, the turbine housing is provided with a by-pass hole communicated with the external volute gas feeding passage, an outlet of the by-pass hole is equipped with a by-pass valve, and the by-pass hole can be opened or closed through the by-pass valve.

When the engine discharge exceeds the adjustment range of the internal volute gas feeding passage and the external volute gas feeding passage, the supercharger can be self-protected by the by-pass valve.

The fixed pressure internal flow passage diffusing width of the outlet of the internal volute gas feeding passage before the gas enters the power turbine along the circumference tail edge of the internal volute gas feeding passage is smaller than the fixed pressure external flow passage diffusing width of the outlet of the external volute gas feeding passage before the gas enters the power turbine along the circumference tail edge of the external volute gas feeding passage, thereby guaranteeing the power and efficiency of gas flowing process.

In a class of this embodiment, the internal volute gas feeding passage is provided with a pulse internal flow passage rib which divides the internal volute gas feeding passage into a left pulse internal flow passage and a right pulse internal flow passage.

In a class of this embodiment, the pulse internal flow passage rib is longitudinally arranged in the internal volute gas feeding passage in a suspended mode, the top of the pulse internal flow passage rib is integrated with the partition wall, and the lower portion thereof is close to the volute diffuser passage.

The internal volute gas feeding passage is divided into the left pulse internal flow passage and the right pulse internal flow passage through the pulse internal flow passage rib. Thus, the pulse energy of the exhaust system within the medium and low speed range of the engine is fully used, thereby meeting the demand of turbines with multi-cylinder more than four cylinders.

The pulse internal flow passage diffusing width of the outlet of the internal volute gas feeding passage before the gas enters the power turbine along the circumference tail edge of the left and right pulse internal flow passages is smaller than the pulse external flow passage diffusing width of the outlet of the external volute gas feeding passage before the gas enters the power turbine along the circumference tail edge of the external volute gas feeding passage, thereby guaranteeing the power and efficiency of gas flowing process.

Advantages of the invention are summarized below.

The invention effectively solves the problems of reliability and high cost of adjusting structures of conventional variable cross-section turbochargers with rotary vanes through designing and developing the gas feeding passage of a turbine of a turbocharger.

The turbine of the turbocharger has a double-layer turbine housing comprising an internal and an external gas feeding passages and a variable cross-section. Variable flow cross-sections are formed through different internal and external gas feeding passages, and thus the waste gas energy of the engine can be efficiently utilized in segments. The engine only utilizes the internal volute gas feeding passage under medium and low speed working conditions to improve the medium and low speed boost pressure of the engine. The external volute gas feeding passage of the engine is opened under the medium and high speed working conditions to work simultaneously with the internal volute gas feeding passage, thereby meeting high flow boost demand of the engine.

The double-layer flow passage variable cross-section turbine in the invention takes advantage of conventional turbocharger structure, and the functions of the variable cross-section turbine is realized through improving traditional flow passage. Furthermore, the invention takes into account the advantages of conventional non-blade diffuser with wider flow range. The variable cross-section turbine in the invention has excellent inheritance and simple structure, the product is easy to upgrade with low cost.

In summary, the variable cross-section turbine with double-layer flow passage can effectively meet the boost demand of engines in full range, a complex rotary vane pneumatic control structure is not needed, and the product is simple and reliable. The invention realizes the variable cross-section functions of turbines through section utilization of waste gas energy discharged by the engine. The overall structure of this type of supercharger is not greatly changed, with low cost and easy implementation.

BRIEF DESCRIPTION OF THE DRAWINGS

The invention patent is further described as follows through combining with attached drawings and embodiments.

Figure 1:
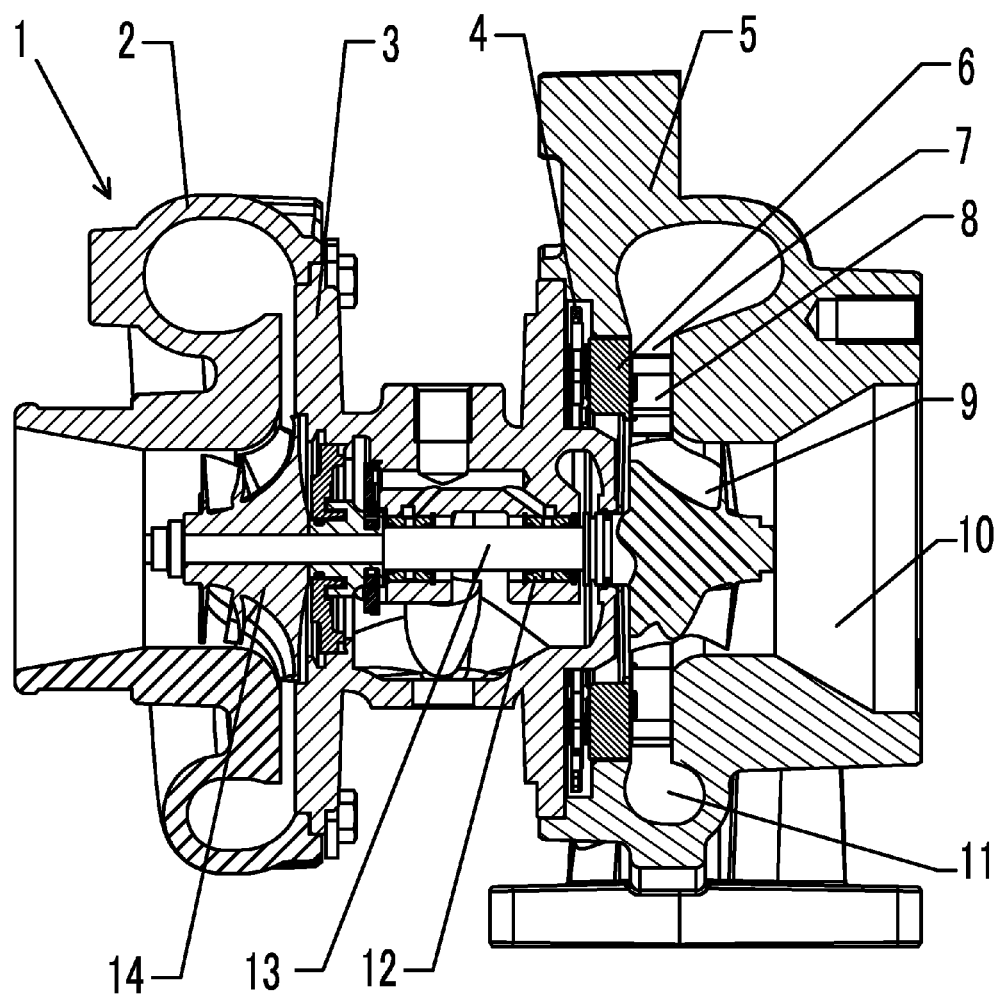
FIG. 1 is a schematic diagram of a variable cross-section turbocharger with rotary vanes in the art.
Figure 2:
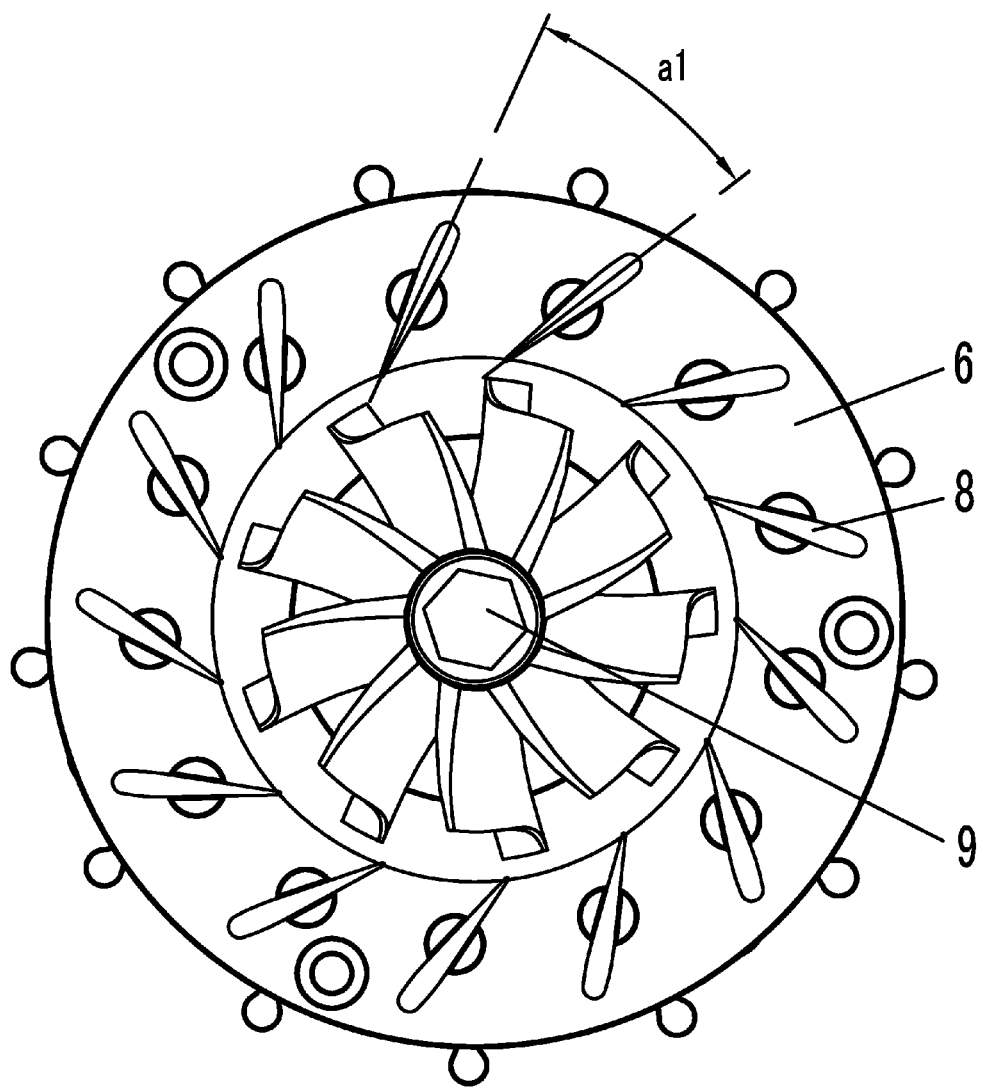
FIG. 2 is a schematic diagram of an adjusting structure of a rotary vane of a variable cross-section turbocharger with rotary vanes in the art.

In the drawings, the following reference numbers are used: 1—variable cross-section turbocharger with rotary vanes; 2—compressor shell; 3—middle shell; 4—transmission mechanism; 5—turbine housing; 6—nozzle ring support disk; 7—volute diffuser channel; 8—nozzle vane; 9—power turbine; 10—volute gas outlet; 11—internal volute gas feeding passage; 12—floating bearing; 13—turbine rotor shaft; 14—compressor impeller; 16—gas flow internal guiding face; 17—flow ribs; 18—gas flow external guiding face; 19—external volute gas feeding passage; 20—internal wall of external volute gas feeding passage; 21—partition wall; 22—fixed pressure volute gas feeding flange; 23—fixed pressure volute gas feeding flange face; 24—fixed pressure volute gas feeding passage matching end surface; 26—by-pass hole; 27—by-pass valve; 29—left pulse internal flow passage; 30—pulse internal flow passage rib; 31—right pulse internal flow passage; 32—pulse volute gas feeding flange face; 33—pulse volute gas feeding flange face; 34—pulse gas feeding internal flow passage matching end surface; 35—outlet of internal volute gas feeding passage; b1—fixed pressure internal flow passage diffusing width; b2—fixed pressure external flow passage diffusing width; c1—pulse internal flow passage diffusing width; c2—pulse external flow passage diffusing width.

DETAILED DESCRIPTION OF THE EMBODIMENTS

Example 1

Figure 3:
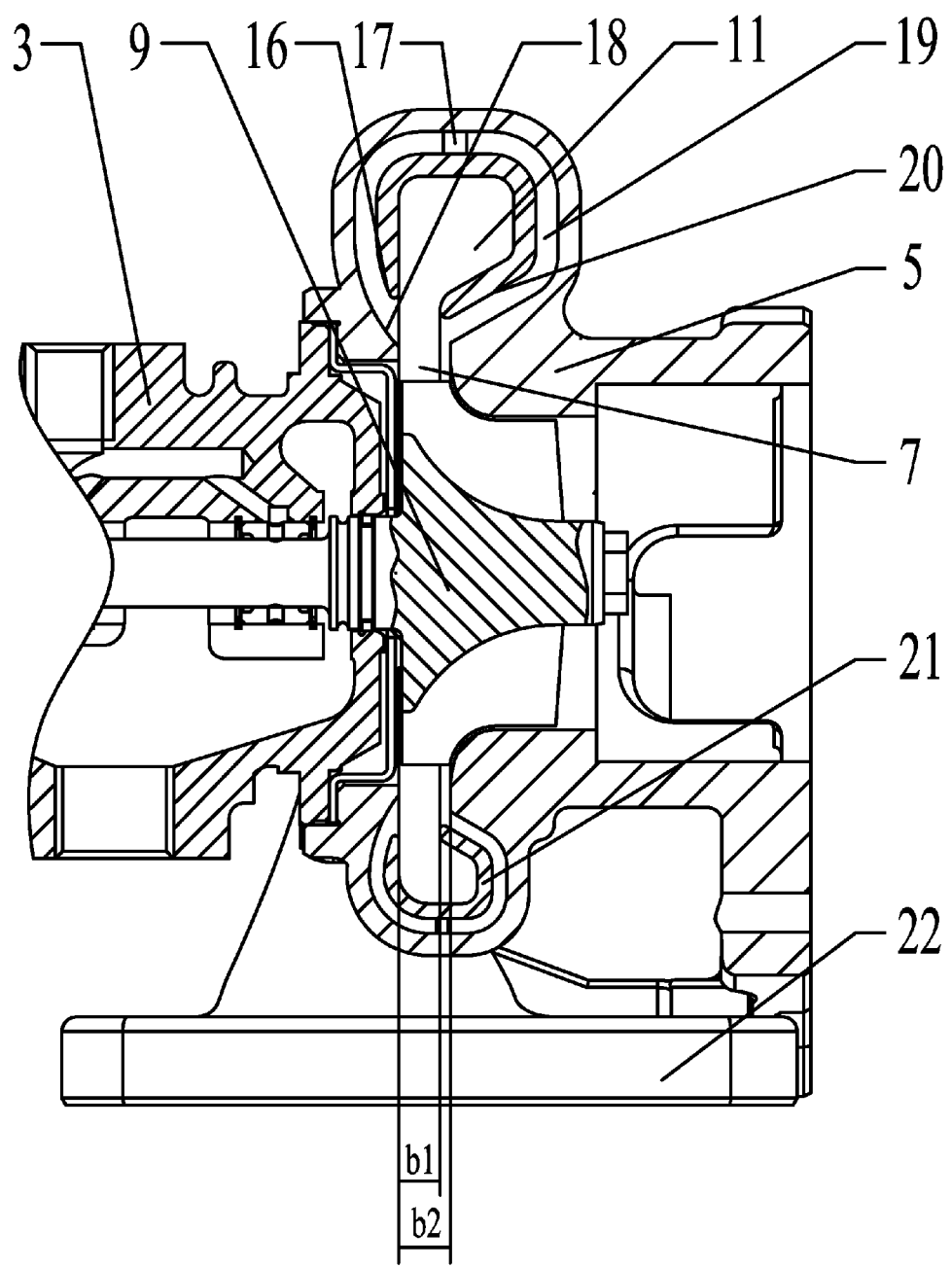
FIG. 3 is a schematic diagram of a turbine of a turbocharger in accordance with one embodiment of the invention.
Figure 4:
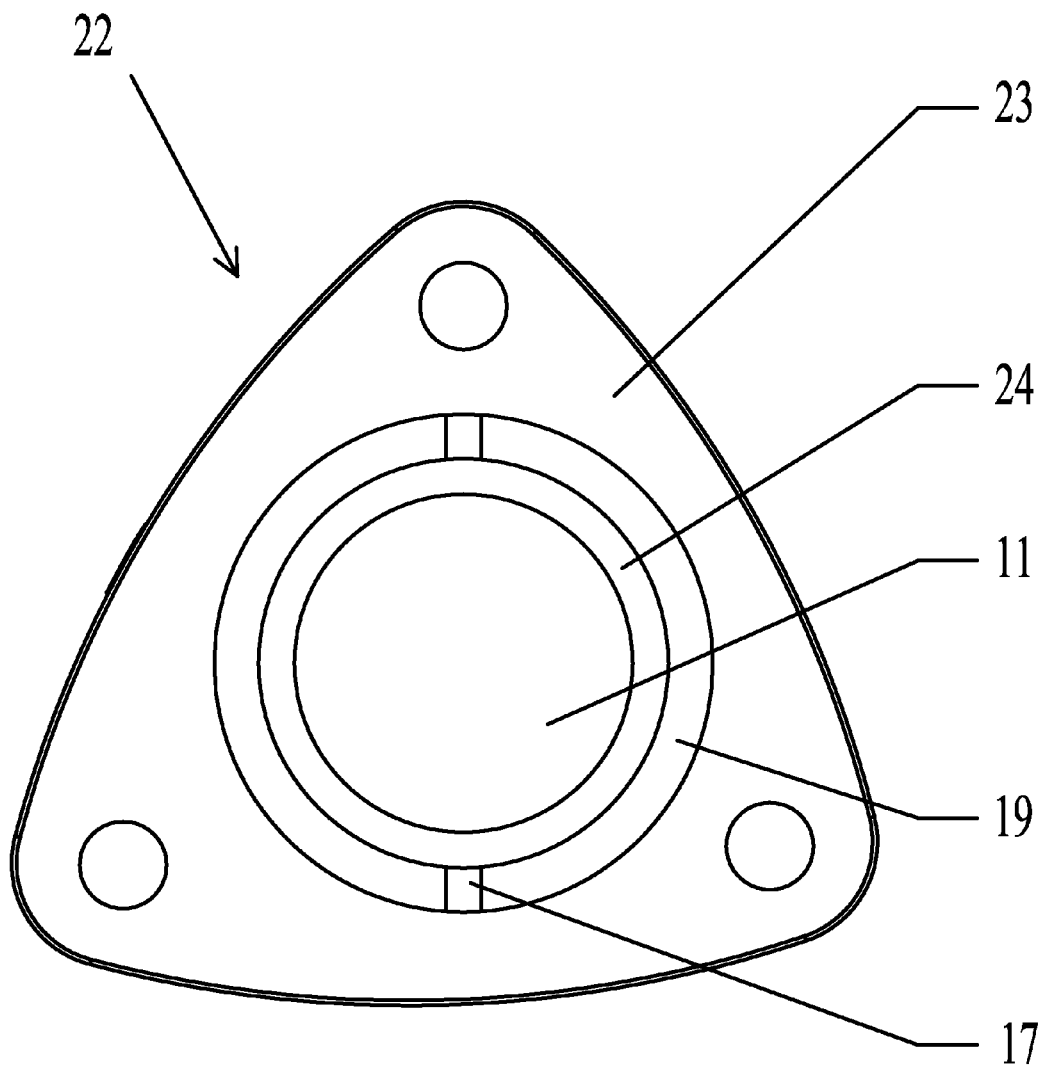
FIG. 4 is a schematic diagram of a gas feeding flange of a turbine housing in accordance with one embodiment of the invention.
Figure 5:
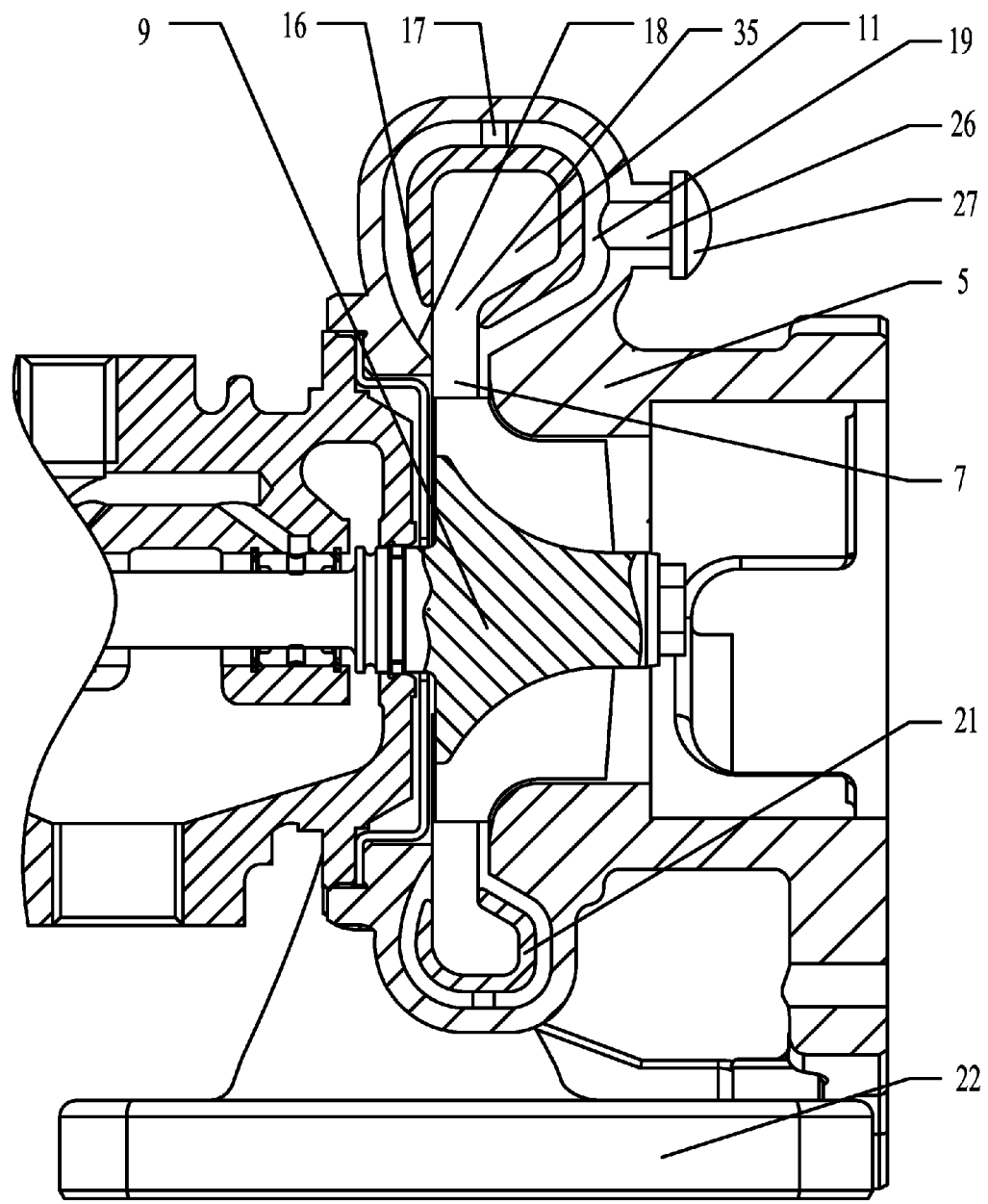
FIG. 5 is a schematic diagram of a turbine of a turbocharger in accordance with another embodiment of the invention.

As shown in FIGS. 3-5, a turbine of a turbocharger comprises a turbine housing 5, a volute diffuser channel 7, and a power turbine 9. A volute gas feeding passage is arranged in the turbine housing 5. A partition wall 21 is arranged in the volute gas feeding passage. The partition wall 21 divides the volute gas feeding passage into an external volute gas feeding passage 19 and an internal volute gas feeding passage 11, and the external volute gas feeding passage 19 is located outside the internal volute gas feeding passage 11. The internal volute gas feeding passage 11 is a single flow passage. An outlet 35 of the internal volute gas feeding passage communicated with the volute diffuser channel 7 is disposed close to a reduced outlet of the external volute gas feeding passage 19. A flow passage rib 17 is arranged in the external volute gas feeding passage 19, and the partition wall 21 is integrated with the shell of the turbine housing 5 through the flow passage rib 17.

The internal volute gas feeding passage 11 works in the whole working condition of an engine. The external volute gas feeding passage 19 is turned on for use on the medium and high rotation speed of the engine through a fixed pressure volute gas feeding flange 22 of the volute housing 5. The partition wall 21 is provided with an internal wall 20 of the external volute gas feeding passage. The internal wall 20 of the external volute gas feeding passage can meet the gas flowing property of the external volute gas feeding passage 19. The external volute gas feeding passage 19 is provided with a reduced outlet communicated with the volute diffuser channel 7, and a gas flow internal guiding face 16 and a gas flow external guiding face 18 are respectively arranged on two sides of the outlet. The high temperature waste gas passing through the internal volute gas feeding passage 11 and the external volute gas feeding passage 19 enters and drives the power turbine 9 to do work through the volute diffuser channel 7. The fixed pressure internal flow passage diffusing width b1 of the outlet of the internal volute gas feeding passage 11 before the gas enters the power turbine along the circumference tail edge of the internal volute gas feeding passage 11 of the external volute gas feeding passage is smaller than the fixed pressure external flow passage diffusing width b2 of the outlet before the gas enters the power turbine along the circumference tail edge of the external volute gas feeding passage to guarantee the sufficient power and pneumatic efficiency.

The waste gas discharged by the engine enters the turbine through the fixed pressure volute gas feeding flange 22. The fixed pressure volute gas feeding flange 22 is provided with a fixed pressure volute gas feeding flange face 23 and a fixed pressure internal volute gas feeding passage matching end face 24. The fixed pressure volute gas feeding flange face 23 and the fixed pressure internal volute gas feeding passage matching end face 24 realize end face matching with the gas flow adjusting structure, the adjusting structure controls the opening and flow area of the external flow passage through the axial movement in the external volute gas feeding passage 19, thereby realizing the function of variable cross-section of turbines. The high temperature gas flowing into the turbine housing 5 from the internal volute gas feeding passage 11 and the internal volute gas feeding passage 19 is distributed around the volute diffuser channel 7 along the circumference of the volute and then enters the power turbine 7 for doing work.

Example 2

As shown in FIG. 5, considering the safety of engines under over-speed conditions, in Example 1, the external volute gas feeding passage 19 is further provided with a by-pass hole 26. An outlet of the by-pass hole 26 is equipped with a by-pass valve 27, and the by-pass hole 26 can be opened or closed through the by-pass valve 27, thereby controlling the pressure of the internal gas flow of the external volute gas feeding passage 19, and realizing the purpose of protecting the turbocharger.

The variable cross-section turbine of the turbocharger with double-layer volute gas feeding passages makes full use of exhaust gas energy, and takes into account booster demand under low speed and high speed working conditions of engines. The turbine of the turbocharger can be manufactured through adopting conventional casting and machining techniques.

Example 3

Figure 6:
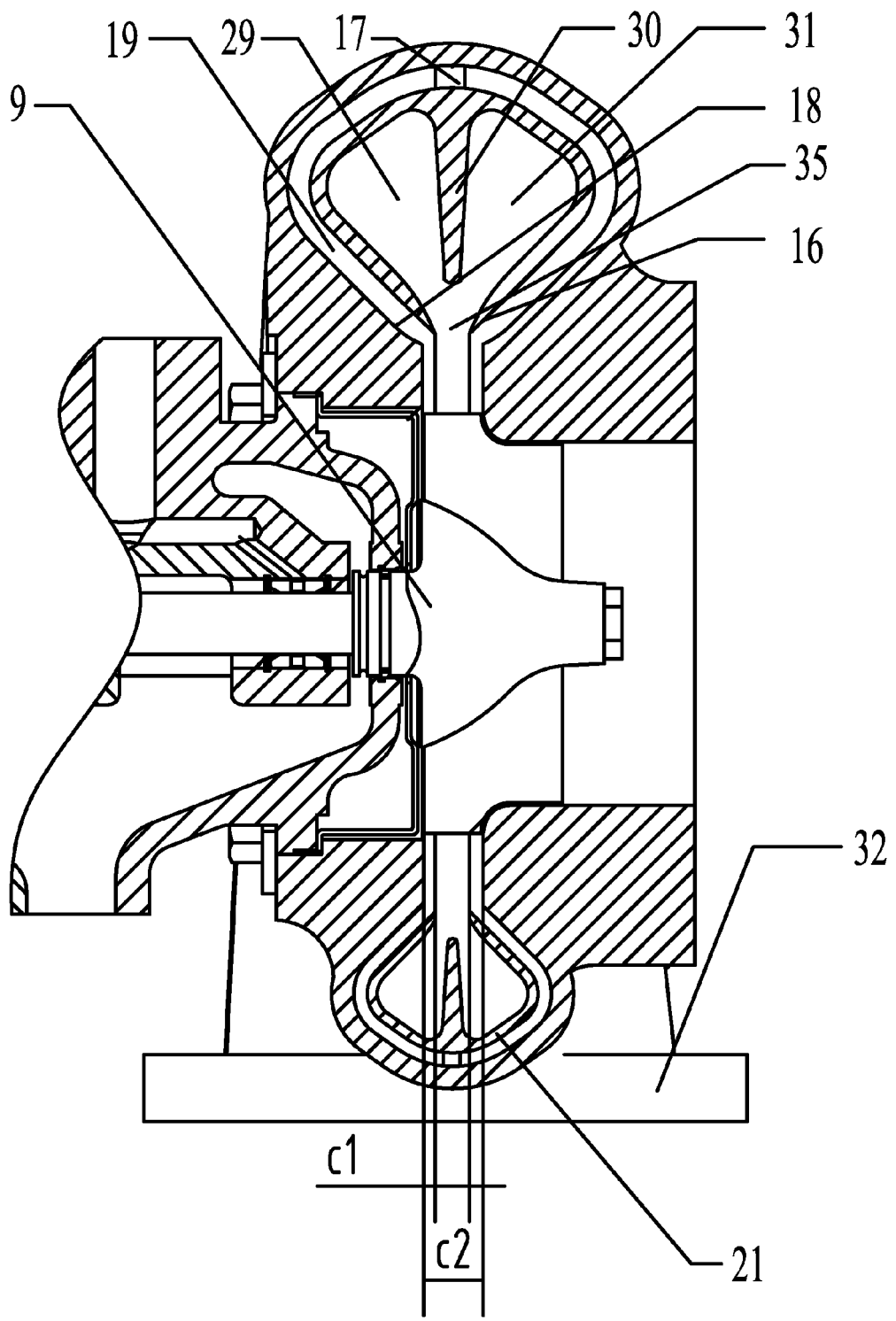
FIG. 6 is a schematic diagram of a turbine of a turbocharger in accordance with still another embodiment of the invention.
Figure 7:
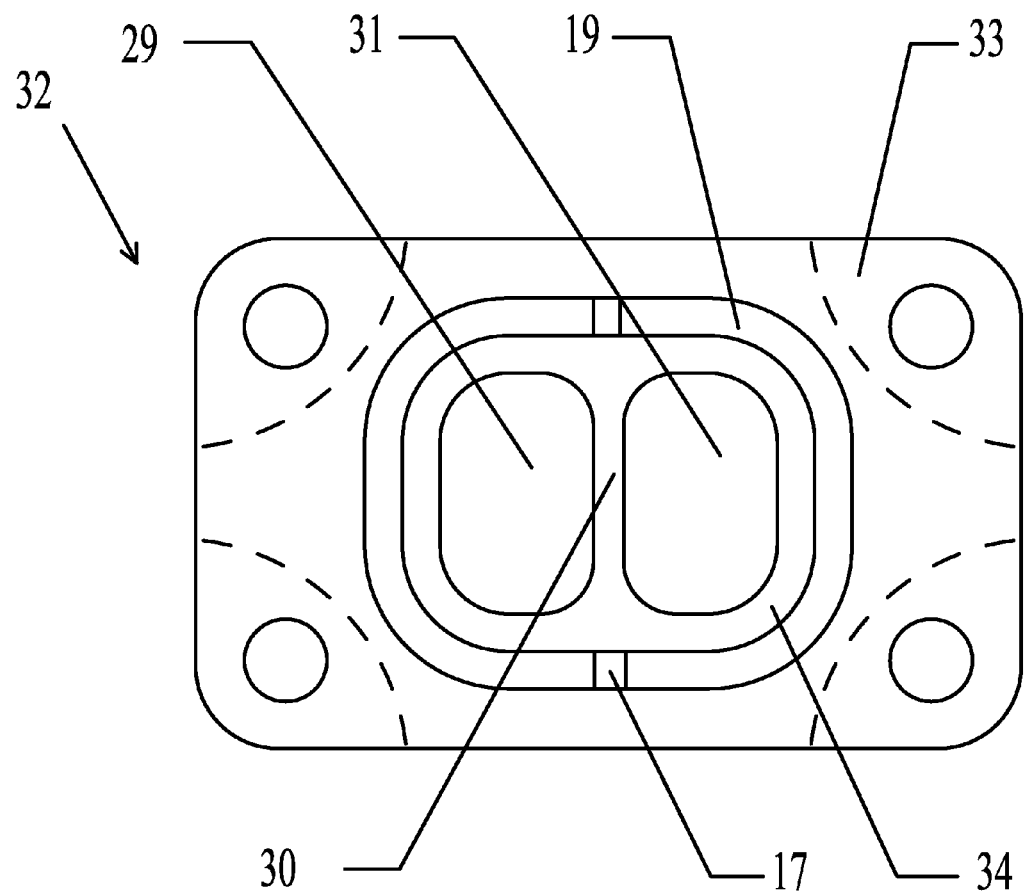
FIG. 7 is a schematic diagram of a gas feeding flange of a turbine housing in accordance with another embodiment of the invention.

As shown in FIGS. 3, 6, and 7, a turbine of a turbocharger comprises a turbine housing 5, a volute diffuser channel 7, and a power turbine 9. A volute gas feeding passage is arranged in the turbine housing 5. A partition wall 21 is arranged in the volute gas feeding passage. The partition wall 21 divides the hollow cavity of the turbine housing 5 into an external volute gas feeding passage 19 and an internal volute gas feeding passage 11, and the external volute gas feeding passage 19 is located outside the internal volute gas feeding passage 11. A flow passage rib 17 is arranged in the external volute gas feeding passage 19, and the partition wall 21 is integrated with the shell of the turbine housing 5 through the flow passage rib 17. The internal volute gas feeding passage 11 is a double flow passage. An outlet 35 of the internal volute gas feeding passage communicated with the volute diffuser channel 7 is close to the reduced outlet of the external volute gas feeding passage 19. A pulse internal flow passage rib 30 is arranged in the internal volute gas feeding passage 11 and divides the volute gas feeding passage into a left pulse internal flow passage 29 and a right pulse internal flow passage 31. The pulse internal flow passage rib 30 is longitudinally arranged in the internal volute gas feeding passage in a suspended mode. The top of the pulse internal flow passage rib is integrated with the partition wall 21, and the lower portion thereof is close to the volute diffuser passage 7. The pulse flow passage fully utilizes the energy of the exhaust system of the engine under the medium and low speed working conditions. The external volute gas feeding passage 19 is located outside the left pulse internal flow passage 29 and the right pulse internal flow passage 31. The external volute gas feeding passage 19 is turned on for use on the medium and high rotation speed in the engine through a pulse volute gas feeding flange 32 of the turbine housing 5, and adjusts the flow area through the adjusting mechanism. The tail edge part of the external volute gas feeding passage 19 is provided with a gas flow internal guiding face 16 and a flow passage external guiding face 18, and the outlets of the gas flow internal guiding face 16 and the flow passage external guiding face 18 are in reduced shapes. The high temperature waste gas passing through the left pulse internal flow passage 29, the right pulse internal flow passage 31, and the external volute gas feeding passage 19 enters and drives the power turbine 9 through the volute diffuser channel 7 for rotation and doing work. The pulse internal flow passage diffusing width c1 of the outlet of the internal volute gas feeding passage before the gas enters the power turbine 9 along the circumference tail edge of the left pulse internal flow passage 29 and the right pulse internal flow passage 31 is smaller than the pulse external flow passage diffusing width c2 of the outlet of the external volute gas feeding passage before the gas enters the power turbine 9 along the circumference tail edge of the external volute gas feeding passage 19 to guarantee sufficient power and pneumatic efficiency.

The waste gas discharged by the engine enters the turbine for work through the pulse volute gas feeding flange 32. The pulse volute gas feeding flange 32 is provided with a pulse volute gas feeding flange face 33 and a pulse internal volute gas feeding passage matching end face 34. The pulse volute gas feeding flange face 33 and the pulse internal volute gas feeding passage matching end face 34 realize end face matching with the gas flow adjusting structure. The adjusting structure controls the opening and flow area of the external flow passage through the axial movement in the external volute gas feeding passage 19, thereby realizing the function of variable cross-section of turbines. The internal gas feeding flow passage is divided into a left part and a right part through the pulse internal flow passage rib 30. The high temperature gas flowing into the turbine housing 5 from the left pulse internal flow passage 29, the right pulse internal flow passage 31, and the internal volute gas feeding passage 19 is distributed around the volute diffuser channel 7 along the circumference of the volute and then enters the power turbine 9 for doing work.

The variable cross-section turbine of the turbocharger with double-layer volute gas feeding passages makes full use of exhaust gas energy, and takes into account booster demand under low speed and high speed working conditions of engines. The turbine of the turbocharger can be manufactured through adopting conventional casting and machining techniques.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A turbine of a turbocharger, the turbine comprising:
a) a turbine housing (5);
b) a volute diffuser channel (7);
c) a power turbine (9);
d) a volute gas feeding passage; and
e) a partition wall (21);
wherein:
the volute gas feeding passage is arranged in the turbine housing (5);
the partition wall (21) is arranged in the volute gas feeding passage and divides the volute gas feeding passage into an external volute gas feeding passage (19) and an internal volute gas feeding passage (11);
the external volute as feeding passage (19) is located outside the internal volute gas feeding passage (11);
the external volute gas feeding passage (19) is provided with a reduced outlet communicated with the volute diffuser channel (7), and a as flow internal guiding face (16) and a gas flow external guiding face (18) are respectively arranged on two sides of the reduced outlet;
the internal volute gas feeding passage (11) is a single flow passage, and a position of the reduced outlet close to the external volute as feeding passage (19) is provided with an outlet (35) of the internal volute gas feeding passage (11) communicated with the volute diffuser passage (7); and
a fixed pressure internal flow passage diffusing width (b1) of the outlet of the internal volute gas feeding passage (11) before the gas enters the power turbine (9) along the circumference tail edge of the internal volute gas feeding passage (11) is smaller than a fixed pressure external flow passage diffusing width (b2) of the outlet of the external volute gas feeding passage (19) before the gas enters the power turbine (9) along the circumference tail edge of the external volute gas feeding passage (19).

2. A turbine of a turbocharger, the turbine comprising:
a) a turbine housing (5);
b) a volute diffuser channel (7);
c) a power turbine (9);
d) a volute gas feeding passage; and
e) a partition wall (21);
wherein:
the volute gas feeding passage is arranged in the turbine housing (5);
the partition wall (21) is arranged in the volute gas feeding passage and divides the volute gas feeding passage into an external volute gas feeding passage (19) and an internal volute gas feeding passage (11);
the external volute gas feeding passage (19) is located outside the internal volute gas feeding passage (11);
the external volute as feeding passage (19) is provided with a reduced outlet communicated with the volute diffuser channel (7), and a gas flow internal guiding face (16) and a as flow external guiding face (18) are respectively arranged on two sides of the reduced outlet;
the internal volute gas feeding passage (11) is a single flow passage, and a position of the reduced outlet close to the external volute gas feeding passage (19) is provided with an outlet (35) of the internal volute gas feeding passage (11) communicated with the volute diffuser passage (7);
the turbine housing (5) is provided with a by-pass hole (26) communicated with the external volute gas feeding passage (19);
an outlet of the by-pass hole (26) is equipped with a by-pass valve (27);
the by-pass hole (26) can be opened or closed through the by-pass valve (27); and
a fixed pressure internal flow passage diffusing width (b1) of the outlet of the internal volute gas feeding passage (11) before the gas enters the power turbine (9) along the circumference tail edge of the internal volute gas feeding passage (11) is smaller than a fixed pressure external flow passage diffusing width (b2) of the outlet of the external volute gas feeding passage before the gas (19) enters the power turbine (9) along the circumference tail edge of the external volute gas feeding passage (19).

3. A turbine of a turbocharger, the turbine comprising:
a) a turbine housing (5);
b) a volute diffuser channel (7);
c) a power turbine (9);
d) a volute gas feeding passage; and
e) a partition wall (21);
wherein:
the volute gas feeding passage is arranged in the turbine housing (5);
the partition wall (21) is arranged in the volute as feeding passage and divides the volute gas feeding passage into an external volute gas feeding passage (19) and an internal volute as feeding passage (11);
the external volute as feeding passage (19) is located outside the internal volute gas feeding passage (11);
a pulse internal flow passage rib (30) is arranged in the internal volute gas feeding passage (11) and divides the internal volute gas feeding passage (11) into a left pulse internal flow passage (29) and a right pulse internal flow passage (31);
the pulse internal flow passage rib (30) is longitudinally arranged in the internal volute gas feeding passage (11) in a suspended mode, the top of the pulse internal flow passage rib (30) is integrated with the partition wall (21), and the lower portion thereof is close to the volute diffuser passage (7); and
a pulse internal flow passage diffusing width (c1) of the outlet of the internal volute gas feeding passage (11) before the gas enters the power turbine (9) along the circumference tail edge of the left pulse internal flow passage (29) and the right pulse internal flow passage (31) is smaller than a pulse external flow passage diffusing width (c2) of the outlet of the external volute gas feeding passage (19) before the gas enters the power turbine (9) along the circumference tail edge of the external volute gas feeding passage (19).

\* \* \* \* \*